(12) United States Patent
Demirer et al.

(10) Patent No.: US 12,529,690 B2
(45) Date of Patent: Jan. 20, 2026

(54) DIGITAL BOTTLE TEST CONSTRAINT OPTIMIZATION AND PREDICTOR

(71) Applicant: Halliburton Energy Services, Inc., Houston, TX (US)

(72) Inventors: Nazli Demirer, Tomball, TX (US); Conrad Teran, Tomball, TX (US); Alejandra Inmaculada Lopez Trosell, Cypress, TX (US); Chunli Li, The Woodlands, TX (US); Robert P. Darbe, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 51 days.

(21) Appl. No.: 18/597,525

(22) Filed: Mar. 6, 2024

(65) Prior Publication Data

US 2025/0283866 A1    Sep. 11, 2025

(51) Int. Cl.
*G01N 33/28* (2006.01)
*G06N 20/00* (2019.01)

(52) U.S. Cl.
CPC ..... *G01N 33/2823* (2013.01); *G01N 33/2835* (2013.01); *G06N 20/00* (2019.01)

(58) Field of Classification Search
CPC . G01N 33/2823; G01N 33/2835; G06N 20/00
See application file for complete search history.

(56) References Cited

U.S. PATENT DOCUMENTS

| | | | |
|---|---|---|---|
| 11,794,132 B2 | 10/2023 | Gottlieb et al. | |
| 2020/0200005 A1 | 6/2020 | Guo et al. | |
| 2021/0102127 A1* | 4/2021 | Raynel | G05D 7/0617 |
| 2022/0002625 A1* | 1/2022 | Bennett | C10G 33/04 |
| 2023/0024753 A1 | 1/2023 | An et al. | |
| 2023/0184076 A1 | 6/2023 | Jutaily et al. | |
| 2023/0258081 A1 | 8/2023 | Jin et al. | |
| 2023/0274801 A1 | 8/2023 | Koseoglu | |
| 2023/0274802 A1 | 8/2023 | Koseoglu | |
| 2023/0274804 A1 | 8/2023 | Koseoglu | |
| 2023/0274805 A1 | 8/2023 | Koseoglu | |
| 2023/0288396 A1 | 9/2023 | Coskun et al. | |
| 2023/0296581 A1 | 9/2023 | Sauerer | |
| 2024/0053274 A1 | 2/2024 | Meissner et al. | |
| 2024/0402659 A1* | 12/2024 | Bin Adnan | G05B 13/0265 |

FOREIGN PATENT DOCUMENTS

| | | |
|---|---|---|
| CA | 2990723 A1 | 2/2017 |
| WO | 2017023858 A1 | 2/2017 |
| WO | 2023183546 A1 | 9/2023 |

OTHER PUBLICATIONS

International Patent Application No. PCT/US2025/011462, International Search Report and Written Opinion mailed May 2, 2025, 9 pages.

* cited by examiner

*Primary Examiner* — Tung S Lau
(74) *Attorney, Agent, or Firm* — Kilpatrick Townsend & Stockton LLP

(57) ABSTRACT

A method can be used to determine the optimal inputs for a bottle test performed by a user for separating water from oil. The bottle test model for predicting inputs to achieve desired KPIs may decrease times required for a user to predict a demulsifier composition. The methods and model may then be utilized for predicting a demulsifier composition based upon inputs of a crude oil product to predict a demulsifier composition for most efficiently separating the oil from water for new production sites.

18 Claims, 5 Drawing Sheets

US 12,529,690 B2

DIGITAL BOTTLE TEST CONSTRAINT OPTIMIZATION AND PREDICTOR

TECHNICAL FIELD

The present disclosure relates generally to wellbore operations and, more particularly (although not necessarily exclusively), to a method of optimizing and predicting demulsification compositions, such as for use in a subterranean formation, a wellbore, a flowline, or other well drilling or servicing or oil production operations.

BACKGROUND

Produced crude oil from subterranean formations usually comes comingled with water from the formation. The water may be free, separating immediately and/or it may form an emulsion due to the crude oil's composition and the fluid dynamics within the wellhead, valves, and flowlines. Both the free and emulsified water must be removed to meet the saleable oil water content standard of 0.5% or less. Emulsions can be very complex and breaking them can be challenging. Specialized emulsion breakers or demulsifiers that effectively accelerate water separation, must be specifically designed for the oil type and production system. These chemicals aid and accelerate the water separation process. Demulsifier dosages can range from a few ppm to hundreds of ppm, with some chemicals having a high cost and others being environmentally unfriendly.

DETAILED DESCRIPTION

Figure 1:
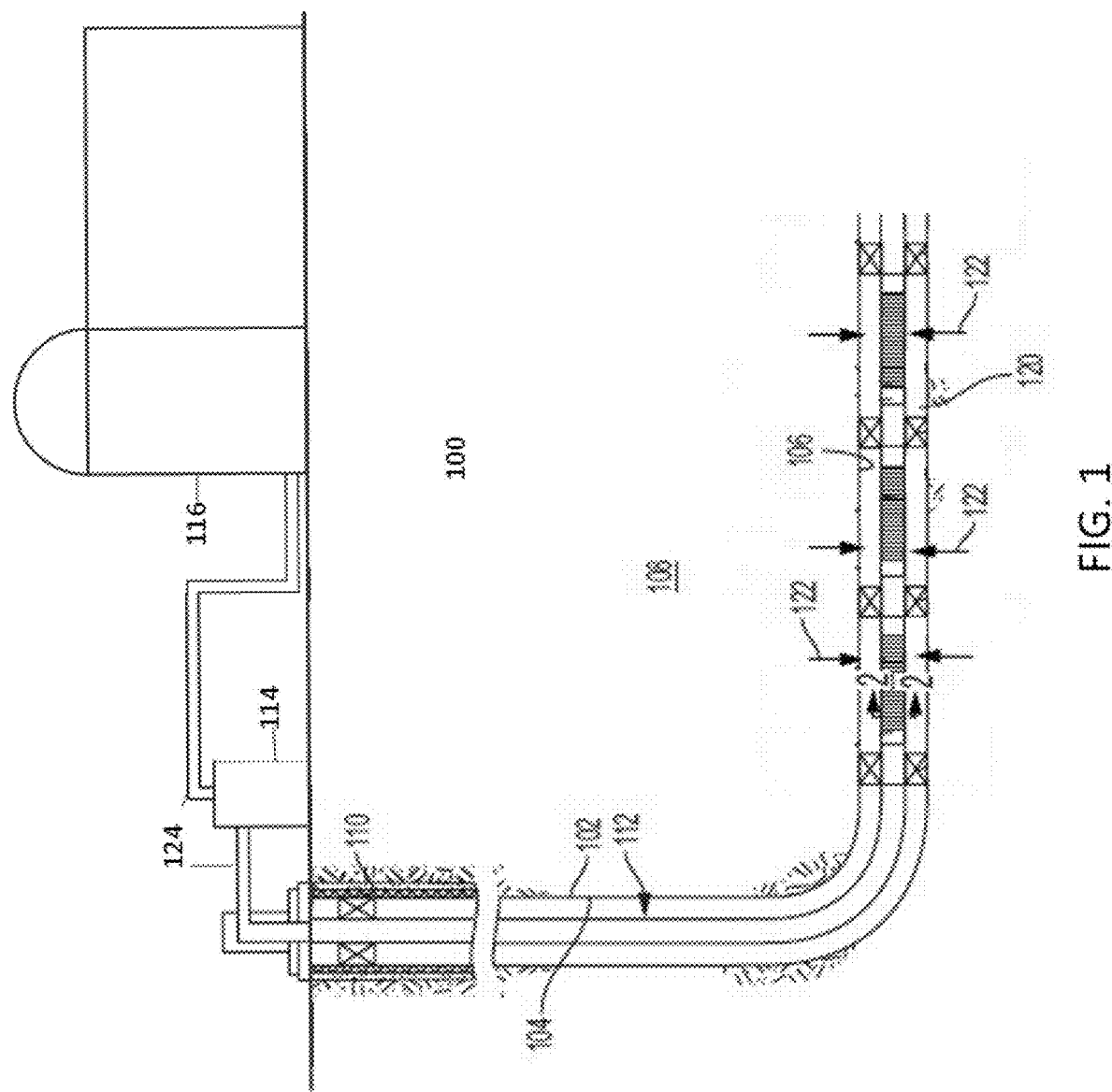
FIG. 1 is a schematic of an example of a wellbore environment with a flowline for carrying fluids from the wellbore and to an onsite location for performing demulsification, according to one aspect of the present disclosure.

Certain aspects and examples of the present disclosure relate to methods and materials for efficiently generating cost-effective and/or improved demulsifier compositions to replace previously used compositions or for new production sites. A demulsifier can be used to separate an emulsion, for example water in oil. Emulsion is a term used to describe a mixture of crude oil from a subterranean formation and water from the formation. The water must be removed from the sellable oil such that the oil has a water content standard of 0.5% or less. Because emulsions can be complex, the demulsifier composition may be complex as well. Methods for characterizing a demulsifier's performance are commonly known as a bottle test benchtop procedure. These methods can include laborious work in a lab with many hours of testing before an optimal demulsifier is determined based on the key performance indicators (KPIs) obtained from the respective treatment facilities. Meaning that at different control points in the facilities the emulsion breaker should meet the expectations (KPIs) for that respective control point. For example, the expected water drop quality, or interface quality. To ensure that the KPIs at each control point are within a threshold limit of the expected KPIs, bottle tests may be performed on samples side-by-side.

The bottle test process for screening and evaluating chemical candidates (intermediates) and/or products (blends of intermediates) can be time consuming and may require skilled professionals to perform the test. In a first step, a development of conditions and or settings such as temperature, agitation speed, and agitation duration to name a few, are predicted to match the desired KPIs on the incumbent KPIs that is being utilized for demulsifying produced crude oil. Several time-consuming iterations may be required to find the right conditions and since campaign time may be limited, the more iterations it takes, leaving less time for the screening process, and thus less likely you are to find the best product recommendation. By producing a bottle test predictor method, a demulsifier based on predetermined KPIs may be generated in a more time efficient manner.

For example, each subterranean formation that produces crude oil can have a different chemical makeup or emulsion that may be very complex and breaking them can be challenging. To most effectively break the emulsion, these specialized chemicals should be tailor made for each production well to account for the different complexities of the emulsion from that well. As stated above, determining what the composition of the demulsifier should be is a laborious process at present using the bottle test to accurately determine the composition of the demulsifier. Simply put, the bottle test is a procedure in which different chemicals are added to bottle samples of an emulsion to determine which chemical is the most effective at breaking, or separating, the emulsion into oil and water. Once an effective chemical is determined, the amount may be carried in different bottle tests to determine the minimum concentration to break the emulsion.

In addition, described herein are methods and materials for predicting the target KPIs of a demulsifier by inputting, into a model described herein, results of a bottle test performed by a user, and a composition into the model, where the model may output a new set of compositions or conditions that may result in the desired KPI. The methods and materials of the model may be described further below.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of an example of a wellbore environment 100 that may include a wellbore 102 with a generally vertical section 104 that transitions into a generally horizontal section 106 extending through the subterranean formation 108. The wellbore 102 may include casing string 110 and a production tubing string 112 that may extend from the surface through the wellbore 102 into the subterranean formation 108. Fluid 122 may be produced from multiple intervals of the formation 108 through portions of the anulus 120. The production tubing string 112 can provide a conduit for formation fluids, such as production fluids from the subterranean formation 108, to travel to the surface. The fluid, upon reaching the surface may first be transported through flowlines 124 to processing equipment 114 before flowing through the remaining flowlines 124 to a treatment facility 116 for performing demulsification, according to one aspect of the present disclosure.

As the fluid from downhole is pumped through the flowlines 124, they may be first treated at processing equipment 114. The processing equipment 114 may be used to first remove coarse material from the fluid passing through the flowlines 124 before reaching the treatment facilities 116. For example, the processing equipment 114 may include a fluid processing system on the surface of the production well 102. The fluid processing system may be used to perform centrifugation of the sample, coarse and fine filtration for the sample, distillation or selective flocculation of polymers or drill solids in the sample. Distillation can involve separating solids from liquids and retaining both the solid phase and the liquid phase for analysis. The coarse and fine filtration of the sample can involve filtering the sample into filtrate and filter-cake. Either the filtrate or the filter-cake may be analyzed to quantify additives in the sample.

The fluid processing system, as part of the processing equipment 114 may also be used to perform selective extraction, in which a solvent can be utilized that selectively extracts a compound of interest into the solvent, separating the compound of interest from other components of the drilling fluid. Any other type of processing may be performed on the sample. In some embodiments, the fluid processing system 114, may be positioned near or inside of the onsite treating facilities 116 located on site. In some embodiments, an operator may perform the methods described herein for forming a demulsifier at the fluid processing systems 114 located at the production well 102 and at the onsite treating facilities 116. In some embodiments, operators may perform bottle tests according to the methods described herein at control points located throughout the onsite treatment facilities 116. For example, a first bottle test may be performed at the initial point of injection into the treatment facility 116 followed by at a second time point after treatment of the crude oil has initiated. At the specified control points, the KPIs measured may meet expected KPIs for that control point.

In many examples, the processing may involve performing solid separation to remove solids above a certain size from the sample. The remaining liquid sample, which may include the crude oil, water trapped within the crude oil, and other chemicals, may be used when performing bottle test methods described herein. A portion of the crude oil may be separated and tested using the bottle test to determine a demulsifier's performance or to identify a more or most efficient demulsifier to separate the water from oil. In some embodiments, the bottle test may be performed more than one time in an iterative process to determine the optimal concentration and chemical composition. For example, a first bottle test may be performed on a crude oil sample, optionally including multiple bottles ran in parallel, with each bottle using a different chemical composition. After the bottle test is done, an evaluation may be made on the chemical composition that most efficiently performed as a demulsifier from those tested. Subsequently, a second bottle test may be performed, using multiple crude oil samples and varied concentrations of the demulsifier to evaluate the best performing concentration.

This process may be repeated until a demulsifier composition that efficiently separates the oil from water is determined, or is within a certain threshold limit set by the user. For example, the method may be performed until the demulsifier composition in the bottle test is within at least 90% similarity to the KPIs of the site or test data. For example, the threshold limit may be at least 90%, 91%, 92%, 93%, 94%, 95%, 96%, 97%, 98%, or 99% similar to the set of key performance indicators of a previously used or incumbent demulsifier used for breaking an emulsion produced from the subterranean formation. In other words, the threshold limit may correspond to values of 10% different or less to the one or more reference key performance indicators.

Additionally, considerations are made, optionally by the user of the test, including the cost of the demulsifier composition, the availability of chemicals to be used, with each consideration impacting the results of the bottle test for the site. For example, the considerations may be referred to herein as constraints on the model. In some embodiments, the methods described herein may be used at every new site or emulsion source and may be used in an iterative fashion using a model that may provide an initial recommendation for a bottle test to be performed. For example, the model may be input with independent variables of the new site such as the oil field, the water cut, the American petroleum institute gravity (API), test conditions including sample temperature, agitation time, agitation speed, and an emulsion breaker composition and concentration.

Figure 2:
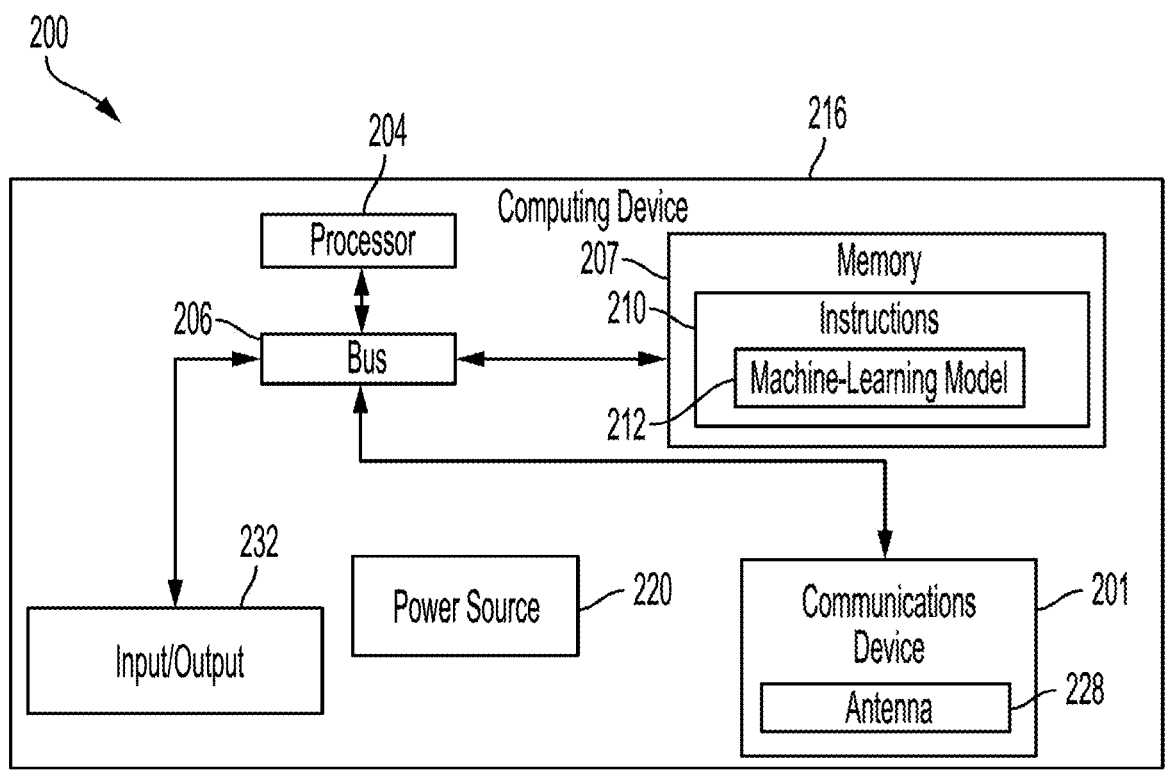
FIG. 2 is a block diagram of an example of a computing device usable for executing program code for producing a demulsifier composition quickly and accurately, according to one aspect of the present disclosure.

FIG. 2 is a block diagram of a computing system 200 for determining test conditions or demulsifier compositions utilizing a machine-learning model or combination of machine-learning models according to one example of the present disclosure. The components shown in FIG. 2, such as the processor 204, memory 207, power source 220, and communications device 201, etc., may be integrated into a single structure, such as within a single housing of a computing device 216. Alternatively, the components shown in FIG. 2 can be distributed from one another and in electrical communication with each other.

The computing system 200 may include the computing device 216. The computing device 216 can include the processor 204, the memory 207 (e.g., non-volatile), and a bus 206. The processor 204 can execute one or more operations for determining the demulsifier composition, relating to crude oil in, or from, the wellbore 100. The processor 204 can execute instructions stored in the memory 207 to perform the operations. The processor 204 can include one processing device or multiple processing devices or cores. Non-limiting examples of the processor 204 include a Field-Programmable Gate Array ("FPGA"), an application-specific integrated circuit ("ASIC"), a microprocessor, etc.

The processor 204 can be communicatively coupled to the memory 207 via the bus 206. The memory 207 may include any type of memory device that retains stored information when powered off. Non-limiting examples of the memory 207 may include EEPROM, flash memory, or any other type of non-volatile memory. In some examples, at least part of the memory 207 can include a medium from which the processor 204 can read the instructions. At least some of the memory 207 includes a non-transitory computer-readable medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, Java, Perl, Python, etc.

In some examples, the memory 207 can include computer program instructions 210 for generating, training, and applying a machine-learning model 212. For example, the computer program instructions 210 can include the machine-learning model 212 that is executable by the processor 204 for causing the processor 204 to determine, the demulsifier composition based on key performance indicators input into the model based on at least one factor of the oil production site. The machine-learning model 212 can be trained using historical data, such as data from a reference demulsifier, data collected from an emulsion produced from the wellbore to be tested using the manual bottle test, synthetic data, or a combination thereof. For example, the computing device 216 can receive data indicating data from a reference demulsifier composition or receive data from the key performance indicators of the current demulsifier composition. Additionally, the computing device 216 can generate synthetic data by generating, instead of measuring, varying types of data relating to demulsifiers based at least in part on previously used demulsifier compositions. The computing device 216 can generate training data using the production wellbore data and the synthetic data, and the computing device 216 can use the training data to train the machine-learning model 212 to interpret new demulsifier compositions received. For example, the trained machine-learning model 212 can be applied to the KPIs of the incumbent demulsifier used for breaking an emulsion produced from a subterranean formation. The machine learning model may then, using the model, generate an output of new KPIs for a revised demulsifier composition.

The computing device can include a power source 220. The power source 220 can be in electrical communication with the computing device 216 and the communications device 201. In some examples, the power source 220 can include a battery or an electrical cable such as a wireline. The power source 220 can include an AC signal generator. The computing device 216 can operate the power source 220 to apply a transmission signal to an antenna 228 to generate electromagnetic waves that convey data relating to the demulsifier composition and KPIs to other systems. For example, the computing device 216 can cause the power source 220 to apply a voltage with a frequency within a specific frequency range to the antenna 228. This can cause the antenna 228 to generate a wireless transmission. In other examples, the computing device 216, rather than the power source 220, can apply the transmission signal to the antenna 228 for generating the wireless transmission.

In some examples, part of the communications device 201 can be implemented in software. For example, the communications device 201 can include additional instructions stored in memory 207 for controlling functions of the communications device 201. The communications device 201 can receive signals from remote devices and transmit data to remote devices. For example, the communications device 201 can transmit wireless communications that are modulated by data via the antenna 228. In some examples, the communications device 201 can receive signals, which may be associated with data to be transmitted, from the processor 204 and amplify, filter, modulate, frequency shift, or otherwise manipulate the signals. In some examples, the communications device 201 can transmit the manipulated signals to the antenna 228. The antenna 228 can receive the manipulated signals and responsively generate wireless communications that carry the data.

The computing device 216 can additionally include an input/output interface 232. The input/output interface 232 can connect to a keyboard, pointing device, display, and other computer input/output devices. A user may provide input using the input/output interface 232. Data relating to the demulsifier composition and bottle test KPIs can be displayed to a user through a display that is connected to or is part of the input/output interface 232. Displayed values can be observed by the user, or by a supervisor of the wellbore, who can make adjustments to demulsifier compositions based on the displayed values. Additionally, or alternatively, the computing device 216 can automatically control or adjust demulsifier composition based on the bottle test measurements made. For example, the computing device may automatically test demulsifier compositions to achieve a set of KPIs that may match the currently employed demulsifier of the produced crude oil. In some embodiments, if the KPIs generated by the computing system does not align with the KPIs currently employed, or is not within the set threshold limit, the computing device may, using the machine learning model, generate a new demulsifier composition to be used on the produced oil or emulsion. In some embodiments, the computing device may be used to predict or otherwise determine the demulsifier composition that may be used for new or otherwise untested crude oil production zones.

For example, a user may, using the model, input key performance indicators for a designated production zone and may receive an output for the optimal emulsion breaker (demulsifier) that may be used to replace the incumbent or alternatively an output for test conditions to be used for bottle tests that replicate or approximately replicate the input key performance indicators, such as for the incumbent demulsifier. The model may be trained on previously performed bottle test methods conducted for producing demulsifiers. The model, may for example, be a constrained non-linear optimizer, that may use the digital bottle test, specified at a given set of emulsion blends that under a given set of constraints, may meet the target KPI of the crude oil production zone. In some embodiments, the machine learning model may be trained by manually performing the bottle test with different compositions of emulsion breakers to achieve a KPI. For example, the method may be further described in FIG. 4 below. The values may then be used to iteratively perform bottle test determinations based only on the inputs of the crude oil production zones.

Figure 3:
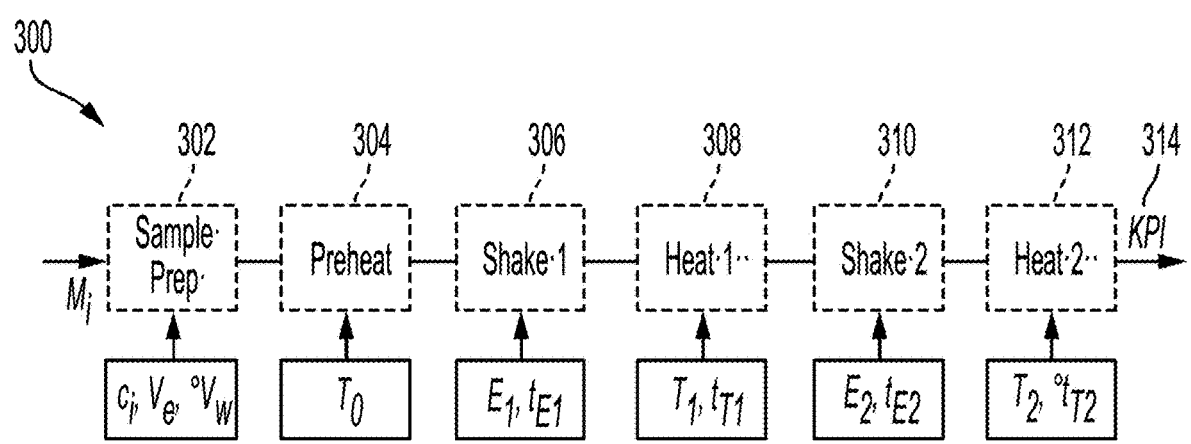
FIG. 3 is a block diagram of a procedure for achieving target KPIs based on methods according to one aspect of the present disclosure.

FIG. 3 is a block diagram of a procedure 300 for achieving target KPIs 318 based on methods according to one aspect of the present disclosure. In a first action the sample may be prepared 302. For example, the sample collected from the production operation may include the crude oil. The crude oil may include a mixture of water in oil. The water may be free, separating immediately, or may form an emulsion due to the crude's composition and the fluid dynamics within the wellhead, valves, and flowlines. Both the free and emulsified water must be removed to meet the saleable oil water content standard of 0.5% or less. In some embodiments, the sample preparation may include inputs into the bottle test such as the concentration (dose) or demulsifier, a volume of emulsion in the bottle, and a volume of free water added to the bottle.

Subsequent to the sample preparation, the bottle is preheated 304 and may be recorded as the initial temperature of the bottle test ($T_0$). The temperature of the bottle test may be from 30° C. to 100° C. for heating the emulsion in the bottle. In some embodiments, the temperature at which the bottle test is performed may be selected based upon the viscosity of the liquid mixture collected from the wellbore. For example, the testing temperature may be from 70° C. to 90° C. is the viscosity of the solution is greater than 90 mm²/s at 40° C. In some embodiments, if the viscosity is below 90 mm²/s at 40° C., the bottle test may be heated to temperatures from 30° C. to 40° C. In some embodiments, the temperature ranges provided may be adjusted such that a solution having a viscosity below 90 mm²/s at 40° C. may be tested at temperatures greater than 40° C. The sample may be subsequently shaken 306 a first time to cause the emulsion to mix. The shaking step may be performed at an agitation rate having an input of agitation/mechanical energy ($E_1$) and also include an agitation/mechanical energy time ($t_{E1}$). The bottle test sample is then set at rest and heated 308 to a temperature range of from 30° C. to 100° C. ($T_1$) for a period of time ($t_{T1}$). The time at which the bottle test is held at temperature $T_1$ may be standard and known by those skilled in the art. For example, the temperature may be held at $T_1$ for about 10 minutes to about 30 minutes. The bottle may be agitated or shaken 310 for a second time ($E_2$). The second shaking step may be identical to the agitation step performed the first time. The agitation may be for ensuring the solution within the bottle is mixed. The bottle may then be placed at rest and heated a second time 312 to a temperature range of from 30° C. to 100° C. ($T_2$) for a period of time ($t_{T2}$). The resulting output data 314 may be the KPIs of the demulsifier. In some embodiments, the KPIs may include, water drop rate, interface quality, water clarity, basic sediments and water, and unresolved emulsion. For example, measurements of the water drop may be performed periodically throughout the bottle test. During the bottle test, water drop readings may be taken at timed intervals such as every 10 to 20 minutes or based at least in part on the retention time. In some embodiments, the first water drop reading may be taken shortly after the first shake 306 step. Other KPI measurements may be observed or collected at the end of the bottle test. For example, following the second round of heating the bottles may be left to rest for from 5 to 30 minutes and an assessment is made on the interface quality, the water clarity, and basic sediments and water.

In some embodiments, the method may use a trained machine-learning model and may be visualized in the process as described in FIG. 3. In some embodiments, the trained machine-learning model may perform an optimization algorithm that emulates bottle test procedures to predict desired key performance indicators based on a set of predictors that describe emulsion characteristics, test conditions, and emulsion breaker formulation and dosage. For example, the model may be based in part on an optimization problem as shown in equation 1.

$$J = \sum_{i=1}^{5} w_i |KPI_i(t_k) - KPI_i^0(t_k)| \quad \text{Equation 1}$$

The optimization problem as shown may have constraints applied. For example, the constraints may include:

$$c_i \leq c_{max}$$

$$T_1 \leq T_{max}$$

$$V_e + V_w \leq V_{max}$$

$$t_{T1,2} \leq \tau_{max}$$

wherein the $c_i$ is the concentration (dose) of demulsifier, $T_1$ is the temperature of the first heating step in the bottle test method as described herein, $V_e+V_w$ are the volume of emulsion in bottle and the volume of free water added to the bottle, and $t_{T1,2}$ is the time that the test is held at the specified temperature range. Other constraints may include maximum concentrations of one or more chemicals in the emulsion breaker formulation, requiring a minimum concentration of one or more chemicals in the emulsion breaker formulation, or reducing the cost of the emulsion breaker.

Furthermore, the optimization problem may be subject to:

$$KPI_i(t_k) = f_i(V_{incumbent}, u)$$

$$Gu \leq h$$

$$x_k \in \text{argmin}\{x_k - x_k^o, k = 1, \ldots, N_v\}$$

Where i is the index for each KPI, the $KPI_i(t_k)$ is the $i^{th}$ key performance indicator at time $t_k$, $V_{incumbent}$ is the volume of the incumbent (demulsifier) and u is the inputs for the bottle test. Additionally, Gu≤h are the constraints as defined above. In some embodiments, equation 1 may be a distance function based on the target KPI. The weight for each KPI may be tuned in such a way that the KPIs with higher priority have more weight. The function $f_i$ may represent the model which described the relationship between the control variables, for example, temperature, agitation speed, agitation duration, and the KPIs. In some embodiments, the model is generated using field and experimental data. For example, machine learning regression methods have been used to generate the model where proper data filtering and outlier detection is performed on the data set. For example, if the model outputs a recommended composition that may result in inaccurate KPIs, the data may be input back into the model to further improve the model for future predictive measures. In some embodiments, the model can be retrained in real-time using data generated in the field to increase accuracy of the model.

Figure 4:
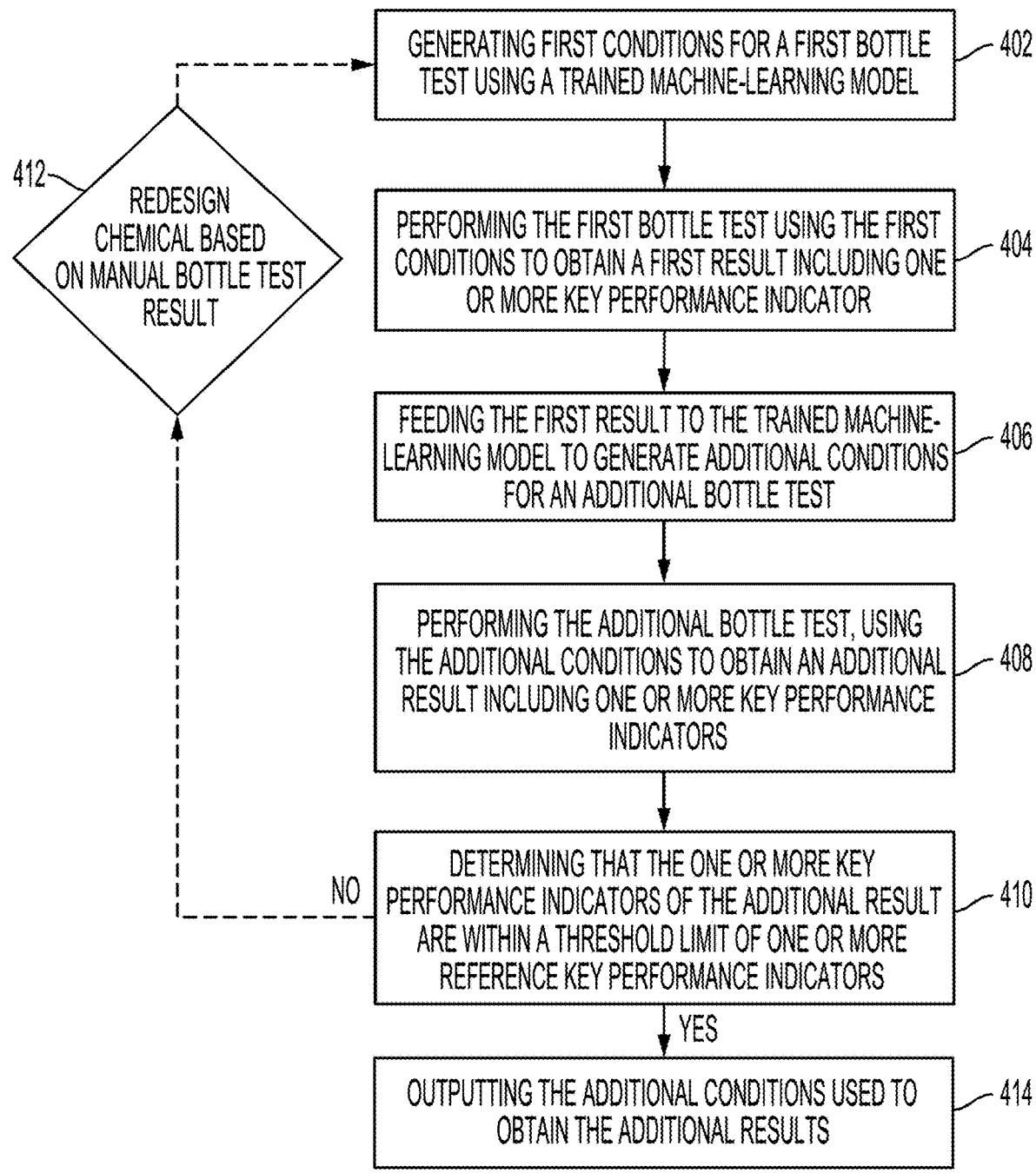
FIG. 4 is a flow chart describing a process for performing real-time production of a demulsifier composition for subterranean formations oil production according to one aspect of the present disclosure.

FIG. 4 is a flow chart describing a process for performing real-time production of a demulsifier composition for subterranean formations oil production according to one aspect of the present disclosure. At block 402, the model may include generating first conditions for a first bottle test using a trained machine-learning model. For example, the inputs can include a concentration (dose) of demulsifier, bottle test temperature, bottle test agitation/mechanical energy, agitation duration, bottle test temperature, bottle test time at temperature, volume of emulsion in bottle, and volume of water added to bottle. The inputs may be the inputs used from previously performed bottle tests to determine the predictive accuracy of the bottle test based upon previously measured KPIs. In some embodiments, the inputs may be values from a new test site or test location that may be used for predicting a demulsifier composition. In some embodiments, the KPIs may include the water drop rate, the interface quality, the water clarity, basic sediments and water, and unresolved emulsion. In some embodiments, the machine learning model may utilize or otherwise incorporate a regression model that may emulate the actions in FIG.

3 as described above. The regression model may be a gradient boosting regressor or linear and/or non-linear regressor models. In some embodiments, the model may include a controller. The controller may be used for identifying the optimal inputs for the bottle test given the model constraints. Other regressor models known by those skilled in the art may be used. In some embodiments, the model may be used in an optimization scheme to generate the optimal set of inputs to achieve target KPIs. A gradient descent can be used to minimize the distance from target KPIs.

At block 404, a user may perform a first bottle test using the first test conditions to obtain a first result including one or more key performance indicators. The manual bottle test may be performed by methods known by those skilled in the art for performing the test. In some embodiments, the user may generate more than one KPI. For example, the bottle test may indicate 1 KPI, 2 KPIs, 3 KPIs, or 4 KPIs. In some embodiments, the KPIs generated from the first bottle test may be compared to the KPIs of the second bottle test for determining if the KPIs are within a threshold limit of one another.

At block 406, the method may include feeding the first result to the trained machine-learning model to generate additional conditions for an additional bottle test. For example, the model may be used in an iterative fashion. For example, the model may be fed a first result information to subsequently output a new set of conditions that may be within a threshold limit of the first bottle test. In some embodiments, the machine-learning model may be fed more than two sets of results of to generate a third set of conditions for a bottle test. In some embodiments, the trained machine-learning model may perform an optimization algorithm that emulates bottle test procedures to predict desired key performance indicators based on a set of predictors that describe emulsion characteristics, test conditions, and emulsion breaker formulation and dosage. In some embodiments, the step of feeding results to the trained machine-learning model and performing additional bottle tests may be repeated until the key performance indicators are within the threshold limit of the one or more reference key performance indicators.

At block 408, the user may perform an additional bottle test using the additional conditions to obtain an additional result including one or more key performance indicators. In some embodiments, the bottle test performed by the user may be performed to generate a new set of test conditions based on a machine-learning model that may learn from the previous data input into the model in an iterative fashion.

At block 410, the additional results including one or more key performance indicators are compared to one or more reference key performance indicators to determine if the additional results including at least one key performance indicator is within a threshold limit to the reference key performance indicators. For example, the reference key performance indicators may include a set of KPIs from the formation currently being evaluated to employ an emulsion breaker or historical data for the formation. In some embodiments, the reference data may be a set of predicted KPIs for the subterranean formation.

In some embodiments, a second bottle test is performed with the incumbent emulsion breaker formulation using the additional conditions to obtain a second result including one or more key performance indicators. The incumbent may be the currently employed emulsion breaker. The results of the second result may be input into a second trained machine learning model to generate a revised emulsion breaker formulation for a new bottle test. The revised emulsion breaker formulation may be different from the incumbent emulsion breaker formulation. In some embodiments, the emulsion breaker described herein may be referred to as a production emulsion breaker. The production emulsion breaker may be modified based on the revised emulsion breaker formulation to produce the modified production emulsion breaker. In some embodiments, the new bottle test with the revised emulsion breaker formulation and using the additional conditions, may be performed to obtain a new result including one or more key performance indicators. The one or more key performance indicators of the new result may be compared to the incumbent key performance indicators to determine if the key performance indicators are within a threshold limit of the incumbent's KPIs. If the results of the bottle test are not within the threshold limit of the incumbent, the chemical formula may be re-designed, and a new bottle test may be performed as shown in block 412. The process may be repeated until the production emulsion breaker KPIs are within the threshold limit of the incumbent KPIs. In some embodiments, if the revised emulsion breaker is within the threshold limit of the incumbent, the revised emulsion breaker may be used for demulsifying produced crude oil.

At block 414, the method may output the additional conditions used to obtain the additional results. For example, the computer device may output the additional conditions that were used to generate the additional results. The output may be performed if the KPIs of the additional results are within the threshold limit of the reference KPIS. The threshold limit may correspond to values of 10% different or less to the one or more reference key performance indicators.

Figure 5:
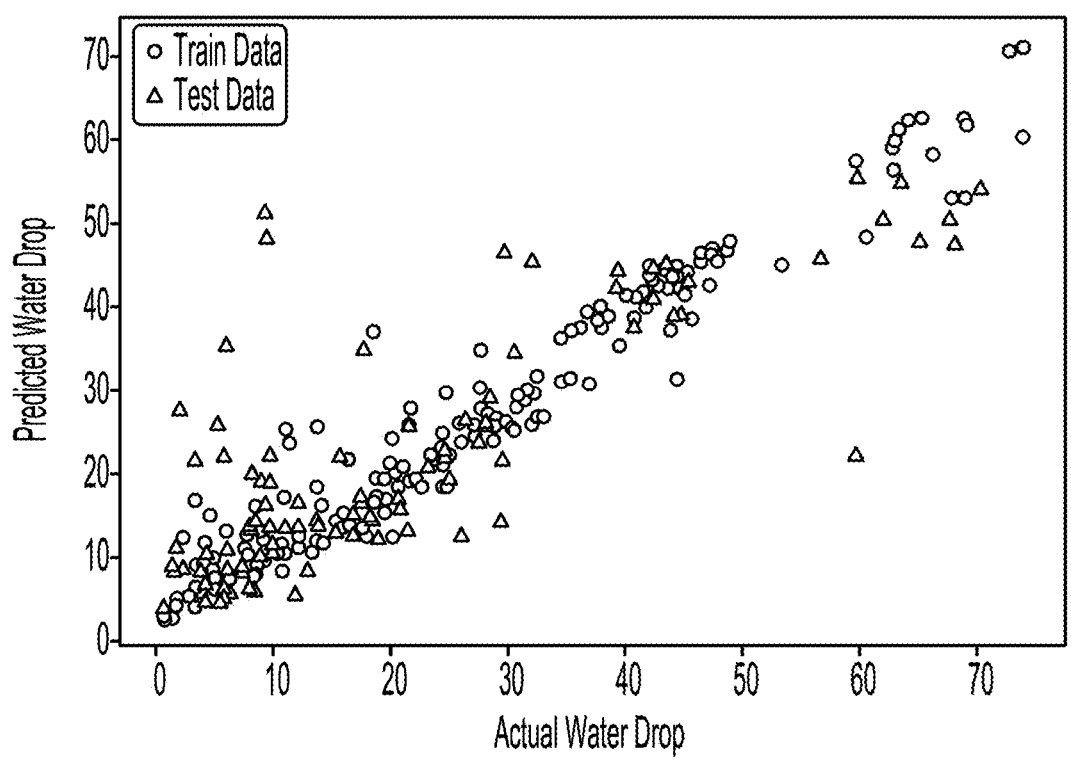
FIG. 5 is a graph of the predicted water drop (y-axis) as compared to the actual water drop (x-axis) of the test data and the training data, according to one aspect of the present invention.

FIG. 5 is a graph of the predicted water drop (y-axis) as compared to the actual water drop (x-axis) of the test data and the training data, according to one aspect of the present disclosure. The graph shows a plot of the predicted water drop (KPI) on the y-axis and the actual water drop on the x-axis for both training data and testing data. The graph is the result for model fitting using gradient boosting regressor with the water drop as the KPI. The results demonstrate the training data may accurately predict the water drop KPI as compared to the actual water drop KPI.

In some embodiments, the model described herein may be based on a second optimization problem. For example, the method may use a second trained machine-learning model and may be visualized in the process as described in FIG. 3. In some embodiments, the second trained machine-learning model may perform an optimization algorithm that emulates bottle test procedures to predict desired key performance indicators based on a set of predictors that describe emulsion characteristics, test conditions, and emulsion breaker formulation and dosage. For example, the optimization problem may be represented by Equation 2, below.

$$\min \quad J = \text{Cost}_{mix} - \sum_{i=1}^{5} w_i KPI_i. \qquad \text{Equation 2}$$

wherein the optimization problem may be subject to the constraint defined below:

$$KPI_i(t) = f_i(V_{mix}, u^*)$$

$$g(c_j, \text{Cost}_{mix}) \leq h$$

$$V_{mix} = \sum_{j \in J} V_j,$$

$$J \subset N, |J| \le 4, N = \{1, \ldots, 144\}$$

$$\text{Cost}_{mix} = \sum_{j \in J} V_j \text{Cost}_j$$

$$KPI_i(t) \ge KPI_i^*$$

wherein the i is the index for each KPI, $KPI_i(t)$ may be the $i^{th}$ KPI at time t. The KPIs can include water drop rate, interface quality, water clarity, basic sediments and water, and unresolved emulsions. In some embodiments, function J of equation 2 above, may define the cost function that may consist of two terms: (i) cost minimization term and (ii) KPI maximization term. The weight of each KPI may be tuned in such a way that the KPIs with higher priority may have more weight. The function $f_i$ may represent the model which describes the relationship between the chemical materials, and each KPIi, given lab setup conditions that may be included in u* that is fixed. For example, u* may be the bottle test conditions (e.g., temperature, agitation temperature, agitation time, agitation energy) and other inputs for the bottle test method.

In some embodiments, constraints may be placed on the concentrations, the cost, and the intermediate availability of the components of the demulsifier. Furthermore, the KPI or target value may be used as a threshold for the model. The model may be trained on historical date, for example, using the model described above for predicting KPIs to perform, in a second step an expected demulsifier composition based at least in part on the inputs that may include a volume of the mixture and a volume of oil component in the mixture. In some embodiments, the model may be retrained in real-time using data generated in the field to increase the accuracy of the model for predicting demulsifier compositions.

In some embodiments, the model described herein include the trained machine-learning model and the second trained machine learning model. Machine learning model may be configured to operate to generate bottle test conditions and emulsion breaker formulations based on inputs including one or more target KPIs, one or more constraints, a crude oil or emulsion characteristics, or any combination thereof.

As used below, any reference to a series of examples is to be understood as a reference to each of those examples disjunctively (e.g., "Examples 1-4" is to be understood as "Examples 1, 2, 3, or 4").

Example 1 is a method comprising: generating first conditions for a first bottle test using a trained machine-learning model; performing the first bottle test using the first conditions to obtain a first result including one or more key performance indicators; feeding the first result to the trained machine-learning model to generate additional conditions for an additional bottle test, wherein the additional conditions are different from the first conditions; performing the additional bottle test, using the additional conditions to obtain an additional result including one or more key performance indicators; determining that the one or more key performance indicators of the additional result are within a threshold limit of one or more reference key performance indicators; and outputting the additional conditions used to obtain the additional result.

Example 2 is the method of example 1, further comprising: repeating feeding results to the trained machine-learning model and performing additional bottle tests until the key performance indicators are within the threshold limit of the one or more reference key performance indicators.

Example 3 is the method of any one of examples 1-2, wherein the key performance indicators include a water drop rate, an interface quality, a water clarity, a basic sediments and water metric, an unresolved emulsion metric, or any combination of these.

Example 4 is the method of any one of examples 1-3, wherein the first conditions and the second conditions include a concentration of demulsifier, a bottle test temperature, a bottle test agitation energy, a bottle test mechanical energy, an agitation energy, a mechanical energy, a volume of an emulsion sample used in the bottle test, a volume of free water used in the bottle test, and any combination of these.

Example 5 is the method of any one of examples 1-4, wherein the threshold limit corresponds to values of 10% different or less to the one or more reference key performance indicators.

Example 6 is the method of any one of examples 1-5, wherein the trained machine-learning model performs an optimization algorithm that emulates bottle test procedures to predict desired key performance indicators based on a set of predictors that describe emulsion characteristics, test conditions, and emulsion breaker formulation and dosage.

Example 7 is the method of any one of examples 1-6, further comprising: performing a second bottle test with an incumbent emulsion breaker formulation using the additional conditions to obtain a second result including one or more key performance indicators; feeding the second result to a second trained machine-learning model to generate a revised emulsion breaker formulation for a new bottle test, wherein the revised emulsion breaker formulation is different from the incumbent emulsion breaker formulation; performing the new bottle test with a revised emulsion breaker formulation using the additional conditions to obtain a new result including one or more key performance indicators; determining that the one or more key performance indicators of the new result are within a threshold limit of one or more incumbent key performance indicators; and outputting the revised emulsion breaker formulation.

Example 8 is the method of example 7, further comprising: modifying a production emulsion breaker formulation based on the revised emulsion breaker formulation to generate a modified production emulsion breaker formulation; and using the modified production emulsion breaker formulation for demulsifying produced crude oil.

Example 9 is the method of any one of examples 7-8, further comprising: feeding a set of constraints to the second trained-machine learning model, wherein the constraints include at least one of reducing a cost of an emulsion breaker formulation, limiting maximum concentrations of one or more chemicals in the emulsion breaker formulation, requiring minimum concentrations of one or more chemicals in the emulsion breaker formulation, and wherein the second trained machine-learning model uses the set of constraints when generating emulsion breaker formulations.

Example 10 is the method of any one of examples 1-9, wherein the second trained machine-learning model performs an optimization algorithm that emulates bottle test procedures to predict desired key performance indicators based on a set of predictors that describe emulsion characteristics, test conditions, and emulsion breaker formulation and dosage.

Example 11 is the method of any one of examples 1-10, wherein the trained machine-learning model and the second trained machine-learning model are a same machine-learning model configured to operate to generate bottle test conditions and emulsion breaker formulations based on inputs including one or more of target key performance indicators, one or more constraints, a crude oil or emulsion characteristics, or any combination of these.

Example 12 is a system comprising: a processor; and a non-transitory computer-readable medium comprising instructions that are executable by the processor to cause the processor to perform operations including: receiving input corresponding to one or more reference key performance indicators; generating first conditions for a first bottle test using a trained machine-learning model; outputting the first conditions for the first bottle test for use in generating a first result including one or more key performance indicators; receiving input corresponding to the first result; generating additional conditions for an additional bottle test using the trained machine-learning model and the first result; outputting the additional conditions for the additional bottle test for use in generating an additional result including one or more key performance indicators, wherein the additional conditions are different from the first conditions; receiving input corresponding to the additional result; determining that the one or more key performance indicators of the additional result are within a threshold limit of one or more reference key performance indicators; and outputting an indicator that the additional conditions used to obtain the additional result are within a threshold limit of one or more reference key performance indicators.

Example 13 is the system of example 12, wherein the key performance indicators include a water drop rate, an interface quality, a water clarity, a basic sediments and water metric, an unresolved emulsion metric, or any combination of these.

Example 14 is the system of any one of examples 12-13, wherein the first conditions and the additional conditions include a concentration of demulsifier, a bottle test temperature, a bottle test agitation energy, a bottle test mechanical energy, an agitation energy, a mechanical energy, a volume of an emulsion sample used in the bottle test, a volume of free water used in the bottle test, and any combination of these.

Example 15 is the system of any one of examples 12-14, wherein the threshold limit corresponds to values of 10% different or less to the one or more reference key performance indicators.

Example 16 is the system of any one of examples 12-15, wherein the trained machine-learning model performs an optimization algorithm that emulates bottle test procedures to predict desired key performance indicators based on a set of predictors that describe emulsion characteristics, test conditions, and emulsion breaker formulation and dosage.

Example 17 is the system of any one of examples 12-16, wherein the operations further include: receiving input corresponding to second results including one or more key performance indicators, wherein the second results are for a second bottle test performed using an incumbent emulsion breaker formulation and the additional conditions; generating a revised emulsion breaker formulation using a second trained machine-learning model, wherein the revised emulsion breaker formulation is different from the incumbent emulsion breaker formulation; receiving input corresponding to new results including one or more key performance indicators for a new bottle test performed using the revised emulsion breaker formulation and the additional conditions; determining that the one or more key performance indicators of the new result are within a threshold limit of one or more incumbent key performance indicators; and outputting the revised emulsion breaker formulation.

Example 18 is the system of example 17, wherein the operations further include: providing a set of constraints to the second trained-machine learning model, wherein the constraints include at least one of reducing a cost of an emulsion breaker formulation, limiting maximum concentrations of one or more chemicals in the emulsion breaker formulation, requiring minimum concentrations of one or more chemicals in the emulsion breaker formulation, and wherein the second trained machine-learning model uses the set of constraints when generating emulsion breaker formulations.

Example 19 is the system of any one of examples 17-18, wherein the second trained machine-learning model performs an optimization algorithm that emulates bottle test procedures to predict desired key performance indicators based on a set of predictors that describe emulsion characteristics, test conditions, and emulsion breaker formulation and dosage.

Example 20 is a computer program product tangibly embodied on non-transitory computer-readable storage medium and comprising instructions that, when executed by a processor, cause the processor to perform operations including: receiving input corresponding to one or more reference key performance indicators; generating first conditions for a first bottle test using a trained machine-learning model; outputting the first conditions for the first bottle test for use in generating a first result including one or more key performance indicators; receiving input corresponding to the first result; generating additional conditions for an additional bottle test using the trained machine-learning model and the first result; outputting the additional conditions for the additional bottle test for use in generating an additional result including one or more key performance indicators, wherein the additional conditions are different from the first conditions; receiving input corresponding to the additional result; determining that the one or more key performance indicators of the additional result are within a threshold limit of one or more reference key performance indicators; and outputting an indicator that the additional conditions used to obtain the additional result are within a threshold limit of one or more reference key performance indicators.

What is claimed is:

1. A method comprising:
generating first conditions for a first bottle test using a trained machine-learning model;
performing the first bottle test using the first conditions to obtain a first result including one or more key performance indicators;
feeding the first result to the trained machine-learning model to generate additional conditions for an additional bottle test, wherein the additional conditions are different from the first conditions;
performing the additional bottle test, using the additional conditions to obtain an additional result including one or more key performance indicators;
determining that the one or more key performance indicators of the additional result are within a threshold limit of one or more reference key performance indicators;
outputting the additional conditions used to obtain the additional result;
performing a second bottle test with an incumbent emulsion breaker formulation using the additional conditions to obtain a second result including one or more key performance indicators;

feeding the second result to a second trained machine-learning model to generate a revised emulsion breaker formulation for a new bottle test, wherein the revised emulsion breaker formulation is different from the incumbent emulsion breaker formulation;

performing the new bottle test with a revised emulsion breaker formulation using the additional conditions to obtain a new result including one or more key performance indicators;

determining that the one or more key performance indicators of the new result are within a threshold limit of one or more incumbent key performance indicators; and outputting the revised emulsion breaker formulation.

2. The method of claim 1, further comprising:

repeating feeding results to the trained machine-learning model and performing additional bottle tests until the key performance indicators are within the threshold limit of the one or more reference key performance indicators.

3. The method of claim 1, wherein the key performance indicators include a water drop rate, an interface quality, a water clarity, a basic sediments and water metric, an unresolved emulsion metric, or any combination of these.

4. The method of claim 1, wherein the first conditions and the additional conditions include a concentration of demulsifier, a bottle test temperature, a bottle test agitation energy, a bottle test mechanical energy, an agitation energy, a mechanical energy, a volume of an emulsion sample used in the bottle test, a volume of free water used in the bottle test, and any combination of these.

5. The method of claim 1, wherein the threshold limit corresponds to values of 10% different or less to the one or more reference key performance indicators.

6. The method of claim 1, wherein the trained machine-learning model performs an optimization algorithm that emulates bottle test procedures to predict desired key performance indicators based on a set of predictors that describe emulsion characteristics, test conditions, and emulsion breaker formulation and dosage.

7. The method of claim 1, further comprising:

modifying a production emulsion breaker formulation based on the revised emulsion breaker formulation to generate a modified production emulsion breaker formulation; and using the modified production emulsion breaker formulation for demulsifying produced crude oil.

8. The method of claim 1, further comprising:

feeding a set of constraints to the second trained-machine learning model, wherein the constraints include at least one of reducing a cost of an emulsion breaker formulation, limiting maximum concentrations of one or more chemicals in the emulsion breaker formulation, requiring minimum concentrations of one or more chemicals in the emulsion breaker formulation, and wherein the second trained machine-learning model uses the set of constraints when generating emulsion breaker formulations.

9. The method of claim 1, wherein the second trained machine-learning model performs an optimization algorithm that emulates bottle test procedures to predict desired key performance indicators based on a set of predictors that describe emulsion characteristics, test conditions, and emulsion breaker formulation and dosage.

10. The method of claim 1, wherein the trained machine-learning model and the second trained machine-learning model are a same machine-learning model configured to operate to generate bottle test conditions and emulsion breaker formulations based on inputs including one or more of target key performance indicators, one or more constraints, a crude oil or emulsion characteristics, or any combination of these.

11. A system comprising:

a processor; and a non-transitory computer-readable medium comprising instructions that are executable by the processor to cause the processor to perform operations including:

receiving input corresponding to one or more reference key performance indicators;

generating first conditions for a first bottle test using a trained machine-learning model;

outputting the first conditions for the first bottle test for use in generating a first result including one or more key performance indicators;

receiving input corresponding to the first result;

generating additional conditions for an additional bottle test using the trained machine-learning model and the first result;

outputting the additional conditions for the additional bottle test for use in generating an additional result including one or more key performance indicators, wherein the additional conditions are different from the first conditions;

receiving input corresponding to the additional result;

determining that the one or more key performance indicators of the additional result are within a threshold limit of one or more reference key performance indicators;

outputting an indicator that the additional conditions used to obtain the additional result are within a threshold limit of one or more reference key performance indicators;

receiving input corresponding to second results including one or more key performance indicators, wherein the second results are for a second bottle test performed using an incumbent emulsion breaker formulation and the additional conditions;

generating a revised emulsion breaker formulation using a second trained machine-learning model, wherein the revised emulsion breaker formulation is different from the incumbent emulsion breaker formulation;

receiving input corresponding to new results including one or more key performance indicators for a new bottle test performed using the revised emulsion breaker formulation and the additional conditions;

determining that the one or more key performance indicators of the new result are within a threshold limit of one or more incumbent key performance indicators; and outputting the revised emulsion breaker formulation.

12. The system of claim 11, wherein the key performance indicators include a water drop rate, an interface quality, a water clarity, a basic sediments and water metric, an unresolved emulsion metric, or any combination of these.

13. The system of claim 11, wherein the first conditions and the additional conditions include a concentration of demulsifier, a bottle test temperature, a bottle test agitation energy, a bottle test mechanical energy, an agitation energy, a mechanical energy, a volume of an emulsion sample used in the bottle test, a volume of free water used in the bottle test, and any combination of these.

14. The system of claim 11, wherein the threshold limit corresponds to values of 10% different or less to the one or more reference key performance indicators.

15. The system of claim 11, wherein the trained machine-learning model performs an optimization algorithm that emulates bottle test procedures to predict desired key performance indicators based on a set of predictors that describe emulsion characteristics, test conditions, and emulsion breaker formulation and dosage.

16. The system of claim 11, wherein the operations further include:
providing a set of constraints to the second trained-machine learning model, wherein the constraints include at least one of reducing a cost of an emulsion breaker formulation, limiting maximum concentrations of one or more chemicals in the emulsion breaker formulation, requiring minimum concentrations of one or more chemicals in the emulsion breaker formulation, and wherein the second trained machine-learning model uses the set of constraints when generating emulsion breaker formulations.

17. The system of claim 11, wherein the second trained machine-learning model performs an optimization algorithm that emulates bottle test procedures to predict desired key performance indicators based on a set of predictors that describe emulsion characteristics, test conditions, and emulsion breaker formulation and dosage.

18. A computer program product tangibly embodied on non-transitory computer-readable storage medium and comprising instructions that, when executed by a processor, cause the processor to perform operations including:
receiving input corresponding to one or more reference key performance indicators;
generating first conditions for a first bottle test using a trained machine-learning;
outputting the first conditions for the first bottle test for use in generating a first result including one or more key performance indicators;
receiving input corresponding to the first result;
generating additional conditions for an additional bottle test using the trained machine-learning model and the first result;
outputting the additional conditions for the additional bottle test for use in generating an additional result including one or more key performance indicators, wherein the additional conditions are different from the first conditions;
receiving input corresponding to the additional result;
determining that the one or more key performance indicators of the additional result are within a threshold limit of one or more reference key performance indicators;
outputting an indicator that the additional conditions used to obtain the additional result are within a threshold limit of one or more reference key performance indicators;
receiving input corresponding to second results including one or more key performance indicators, wherein the second results are for a second bottle test performed using an incumbent emulsion breaker formulation and the additional conditions;
generating a revised emulsion breaker formulation using a second trained machine-learning model, wherein the revised emulsion breaker formulation is different from the incumbent emulsion breaker formulation;
receiving input corresponding to new results including one or more key performance indicators for a new bottle test performed using the revised emulsion breaker formulation and the additional conditions;
determining that the one or more key performance indicators of the new result are within a threshold limit of one or more incumbent key performance indicators; and
outputting the revised emulsion breaker formulation.

\* \* \* \* \*